United States Patent [19]
Ching-Ming

[11] Patent Number: 5,680,426
[45] Date of Patent: Oct. 21, 1997

[54] STREAK SUPPRESSION FILTER FOR USE IN COMPUTED TOMOGRAPHY SYSTEMS

[75] Inventor: Lai Ching-Ming, Wakefield, Mass.

[73] Assignee: Analogic Corporation, Peabody, Mass.

[21] Appl. No.: 587,468

[22] Filed: Jan. 17, 1996

[51] Int. Cl.[6] .................................................. A61B 6/03
[52] U.S. Cl. ........................ 378/8; 378/901; 364/413.19
[58] Field of Search ................................. 378/4, 8, 901; 364/413.16, 413.19

[56] References Cited

U.S. PATENT DOCUMENTS

| | | | |
|---|---|---|---|
| 4,463,375 | 7/1984 | Macovski | 378/98.12 |
| 5,400,377 | 3/1995 | Hu et al. | 378/8 |
| 5,416,815 | 5/1995 | Hsieh | 378/4 |
| 5,473,655 | 12/1995 | Hu | 378/4 |

OTHER PUBLICATIONS

Jiang Hsieh, *Image Artifacts, Causes and Correction*, Medical CT & Ultrasound: Current Technology and Applications (Goldman et al., ed.) Advanced Medical Publishing (1995) pp. 487–517.

*Primary Examiner*—David P. Porta
*Assistant Examiner*—David Vernon Bruce
*Attorney, Agent, or Firm*—Lappin & Kusmer LLP

[57] ABSTRACT

The disclosed streak suppression filter is for use with a Computed Tomography (CT) system. The CT system generates a plurality of projection data signals each of which is representative of the density of a portion of an object. The streak suppression filter includes a spatial filter for receiving the projection data signals and for generating therefrom a low frequency signal and a high frequency signal. The streak suppression filter further includes a non-linear filter for generating a filtered signal from the high frequency signal. The streak suppression filter further includes a device for combining the low frequency and filtered signals to generate a streak corrected signal. The streak suppression filter may form the low frequency signal by low pass filtering the raw density signals and may form the high frequency signal by subtracting the low frequency signal from the corresponding raw density signal. The streak suppression filter may form the filtered signal by clipping, or thresholding, the high frequency signal.

24 Claims, 9 Drawing Sheets

STREAK SUPPRESSION FILTER FOR USE IN COMPUTED TOMOGRAPHY SYSTEMS

FIELD OF THE INVENTION

The present invention relates generally to Computed Tomography (CT) systems used in the medical arts for generating CT images of, for example, human patients. More particularly, the invention relates to an improved streak suppression filter for reducing streaks in CT images.

BACKGROUND OF THE INVENTION

Computed Tomography (CT) systems of the third generation type include an X-ray source and an X-ray detector system secured respectively to diametrically opposite sides of an annular-shaped disk. The disk is rotatably mounted within a gantry support so that during a scan, the disk continuously rotates about a rotation axis while X-rays pass from the source through an object positioned within the opening of the disk to the detector system.

The detector system typically includes an array of detectors disposed as a single row in the shape of an arc of a circle having a center of curvature at the point, referred to as the "focal spot", where the radiation emanates from the X-ray source. The X-ray source and the array of detectors are positioned so that the X-ray paths between the source and each detector all lie in the same plane (hereinafter the "slice plane" or "scanning plane") which is normal to the rotation axis of the disk. Since the X-ray paths originate from what is substantially a point source and extend at different angles to the detectors, the X-ray paths resemble a fan, and thus the term "fan beam" is frequently used to describe all of the X-ray paths at any one instant of time. The X-rays incident on a single detector at a measuring instant during a scan are commonly referred to as a "ray", and each detector generates an output signal indicative of the intensity of its corresponding ray. Since each ray is partially attenuated by all the mass in its path, the output signal generated by each detector is representative of the density of all the mass disposed between that detector and the X-ray source (i.e., the density of the mass lying in the detector's corresponding ray path).

The output signals generated by the X-ray detectors are normally processed by a signal processing portion of the CT system. The signal processing portion generally includes a data acquisition system (DAS) which filters the output signals generated by the X-ray detectors to improve their signal-to-noise ratio. The filtered output signals generated by the DAS are commonly referred to as "raw data signals". The signal processing portion usually includes a projection filter which logarithmically processes the raw data signals to generate a set of projection data signals so that each projection data signal is representative of the density of the mass lying in a corresponding ray path. The collection of all the projection data signals at a measuring instant or interval is commonly referred to as a "projection" or a "view". During a single scan, as the disk rotates, a plurality of projections are generated such that each projection is generated at a different angular position of the disk. The angular orientation of the disk corresponding to a particular projection is referred to as the "projection angle".

Using well known algorithms, such as the Radon algorithm, a CT image may be generated from all the projection data signals collected at each of the projection angles. A CT image is representative of the density of a two dimensional "slice", along the scanning plane, of the object being scanned. The process of generating a CT image from the projection data signals is commonly referred to as "filtered back projection" or "reconstruction", since the CT image may be thought of as being reconstructed from the projection data. The signal processing portion normally includes a back-projector for generating the reconstructed CT images from the projection data signals.

One problem with CT systems is that a variety of noise and error sources may potentially contribute noise or artifacts to the reconstructed CT images. CT systems therefore typically employ a host of signal processing techniques to improve the signal-to-noise ratio and to reduce the presence of artifacts in the reconstructed CT images.

One important type of noise in CT systems is manifested in the form of "streak like" artifacts, commonly known as "streaks", in the reconstructed CT images. FIG. 1 is an exemplary reconstructed CT image of a human head that is illustrative of the problems associated with streaks. In FIG. 1 the white areas represent bone and the grey areas represent soft tissue. As those skilled in the art will appreciate, the soft tissue regions in FIG. 1 contain many streaks which interfere with interpretation of the image.

One important factor which can give rise to streaks is aliasing caused by the finite size and spacing of the detectors in the detector array. Interfaces between bone and soft tissue of the patient, referred to as "bone-tissue interfaces", generate high frequency components in the projection data signals which are often under sampled due to the finite size and spacing of the detectors. Such under sampling gives rise to streaks in the reconstructed CT images. Streaks may also be caused by other factors such as movement of the patient or the gantry during a scan, or by the presence of metal implants or other high density prostheses in the patient.

FIGS. 2A–B illustrate why bone-tissue interfaces generate high frequency components in the projection data. As those skilled in the art will appreciate, FIGS. 2A–B are not drawn to scale and are presented merely for illustrative purposes. FIG. 2A shows the spatial relationship between a cross section of a patient 50, an X-ray source 42, and a portion of a detector array 44 for a single projection angle. The cross section of patient 50 is disposed between source 42 and detector array 44 and contains a region of soft tissue 50:A and a region of bone 50:B. The detector array 44 shown includes seven individual detectors 44:1–44:7, and source 42 emits a fan beam 52 such that a ray 52:1 is incident on detector 44:1, ray 52:2 is incident on detector 44:2, and so on. The output signals DET generated by the detector array 44 are filtered by DAS 45 which generates the corresponding raw data signals RDS. The DAS 45 as shown includes seven individual units 45:1–45:7, each unit corresponding to one detector. The raw data signals generated by DAS 45 are then filtered by an array 47 of projection filters which generate the projection data signals PDS. The array 47 as shown includes seven individual projection filters 47:1–47:7, each filter corresponding to one detector.

FIG. 2B is a graph of the amplitude of the projection data signals PDS generated by array 47. Since detectors 44:1, 44:2, 44:6 and 44:7 have only soft tissue (and air) disposed in their respective ray paths, the amplitude of the projection data signals generated by the corresponding projection filters 47:1, 47:2, 47:6 and 47:7 is relatively small. Since detectors 44:3, 44:4 and 44:5 have some bone disposed in their respective ray paths, and since bone is much denser than soft tissue, the amplitude of the projection data signals generated by the corresponding projection filters 47:3, 47:4 and 47:5 is relatively large. So the transition from soft tissue to bone (i.e., the bone-tissue interface) is represented in the projection data as a sharp "edge" or discontinuity, the edge being located where the amplitude changes rapidly (the edges being located in FIG. 2B at the transition between detectors 44:2 and 44:3, and at the transition between detectors 44:5 and 44:6). Such sharp edges represent high frequency components in the projection data.

As shown in FIG. 2A, detector 44:3 straddles a bone-tissue interface (as does detector 44:5) meaning that a portion of the bone near the interface as well as a portion of the soft tissue near the interface are disposed in the ray path 52:3. In this position the intensity of ray 52:3 which is incident on detector 44:3 is representative of an average of the bone and tissue densities. Therefore, by straddling the bone-tissue interface, detector 44:3 "blurs", or under samples, the location of the interface. During a scan a single detector will typically straddle a bone-tissue interface for several projection angles before the disk rotates sufficiently to place a new detector under the interface. This new detector will then straddle the interface for several more projection angles. Having detectors straddle an interface in this manner for several projection angles makes it difficult for the scanner to precisely locate the interface and gives rise to streaks in the reconstructed CT images.

One prior an method of reducing streaks is to decrease the size of the detectors and pack the detectors more closely together. Although simple and effective, this method raises the cost of the system because more detectors are required, and the manufacturing requirements for such small size detectors may exceed the limit of current technology.

Another method of reducing streaks is to apply a linear low pass filter to the projection data and thereby remove the high frequency components that later give rise to streaks. Such a low pass filter is often incorporated into a convolution filter which ordinarily convolves the projection data signals with known convolution masks prior to applying these signals to the back-projector. The convolution filter may be thought of as being part of the back-projector. The low pass filter is also sometimes implemented by using a physical pre-filter, which averages or blurs the data, between the detectors and the X-ray source. One common and practical approach to achieving such a physical prefilter is to enlarge or oscillate the X-ray focal spot. Such methods do reduce streaks, however, they also have the disadvantage of removing high frequency components which are rich in information and thereby reduce the quality of the generated CT images. in general, such linear filters are not capable of sufficiently filtering the data to reduce streaks without also having the unwanted effect of reducing the quality of the CT images.

There is therefore a need for improved methods of and apparatus for reducing streaks in CT images.

OBJECTS OF THE INVENTION

It is an object of the present invention to substantially reduce or overcome the above-identified problems of the prior art.

Another object of the present invention is to provide an improved streak suppression filter.

And another object of the present invention is to provide an improved non-linear streak suppression filter for reducing streaks in CT images.

Yet another object of the invention is to provide an improved streak suppression filter for suppressing high amplitude, high frequency components of its input signals.

And another object of the present invention is to provide an improved streak suppression filter including a high pass filter and a non-linear filter for filtering the output signals generated by the high pass filter.

Still another object of the present invention is to provide an improved streak suppression filter including a high pass filter and a threshold device for clipping the output of the high pass filter.

SUMMARY OF THE INVENTION

These and other objects are provided by an improved streak suppression filter for use with a CT system. The CT system generates a plurality of projection data signals each of which is representative of the density of a portion of an object, and the CT system includes an image generating device for generating an image of the object from a plurality of projection signals. The streak suppression filter includes a spatial filter for receiving the projection data signals and for generating therefrom a plurality of low frequency signals and a plurality of high frequency signals. The streak suppression filter further includes a non-linear filter for filtering the high frequency signals to generate a plurality of filtered signals, and a device for combining corresponding low frequency and filtered signals to generate a plurality of streak corrected signals. The streak suppression filter then applies the streak corrected signals to the image generating device which generates therefrom a CT image of the object having reduced streaks.

In one aspect, the streak suppression filter forms the low frequency signals by low pass filtering the projection data signals and forms the high frequency signals by subtracting the low frequency signals from their corresponding projection data signals.

In another aspect, the non-linear filter includes a threshold device for generating the filtered signals by clipping the high frequency signals when they are greater than a threshold.

Still other objects and advantages of the present invention will become readily apparent to those skilled in the art from the following derailed description wherein several embodiments are shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE DRAWINGS

For a fuller understanding of the nature and objects of the present invention, reference should be had to the following detailed description taken in connection with the accompanying drawings in which the same reference numerals are used to indicate the same or similar parts wherein:

FIGS. 7A–E are graphs showing examples of transfer functions which may be used by the threshold devices shown in FIGS. 4 and 5;

DETAILED DESCRIPTION OF THE DRAWINGS

Figure 3:
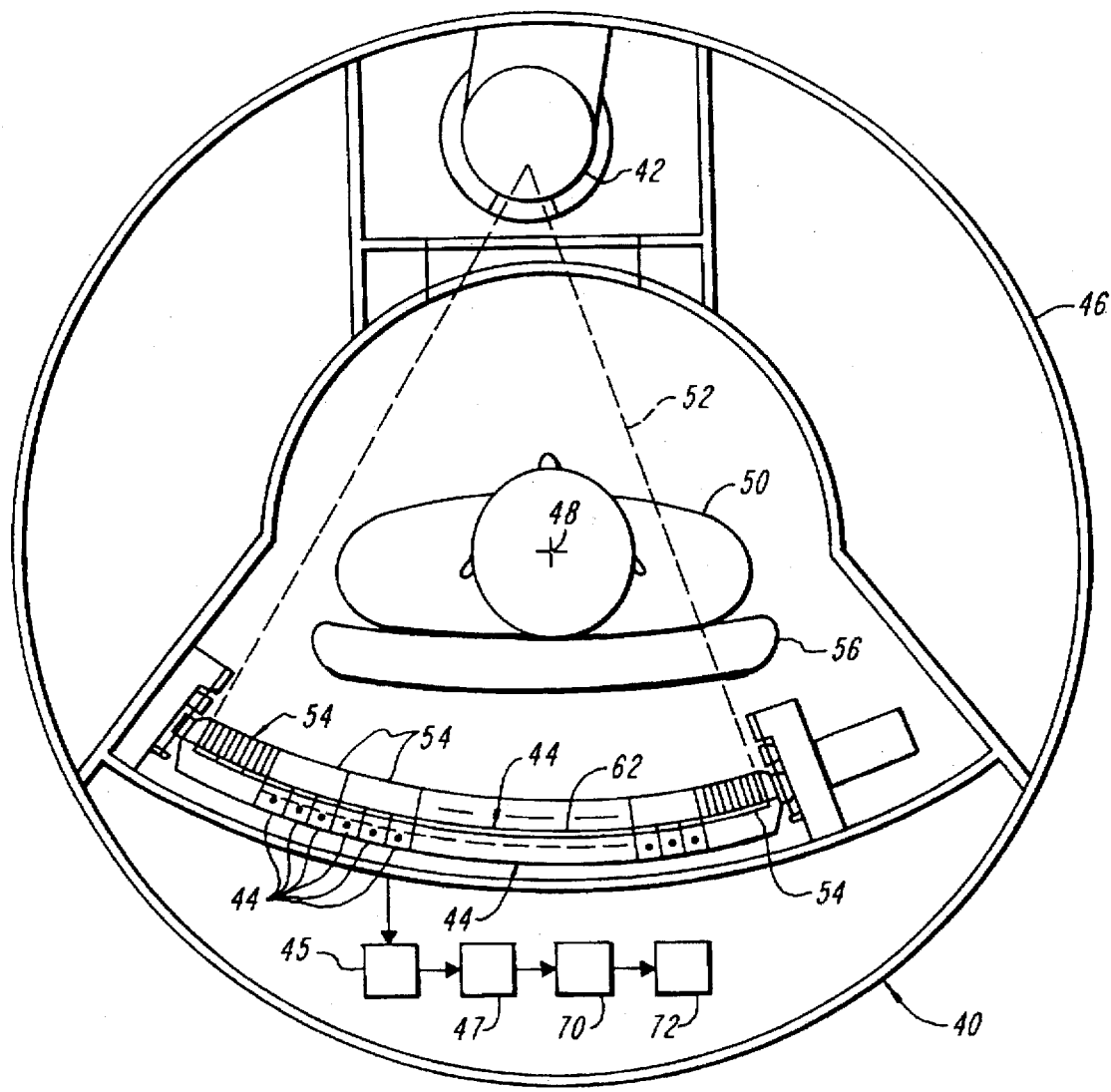
FIG. 3 is an axial view of a CT scanner including a streak suppression filter constructed according to the invention.

FIG. 3 shows an exemplary CT system, or scanner, 40 incorporating the principles of the present invention. Scanner 40 includes an X-ray source 42 and a detector assembly 44 comprising an array of detectors mounted to a disk 46. Source 42 and detector assembly 44 are rotated about a rotation axis 48 (extending normal to the view shown in FIG. 3) so as to rotate around the object 50 that extends through the central opening of the disk 46 during a CT scan. Object 50 may be a part of a live human patient, such as the head or torso. Source 42 emits within the scanning plane (normal to rotation axis 48) a continuous fan-shaped beam 52 of X-rays, which are sensed by the detectors of assembly 44 after passing through object 50. An array of anti-scatter plates 54 is preferably located between object 50 and the detectors of assembly 44 to substantially prevent scattered rays from being sensed by the detectors. In a preferred embodiment the detectors number 384 and cover an arc of 48°, although the number and angle can vary. Disk 46, which may advantageously be of a light weight material, such as aluminum, is caused to rotate rapidly and smoothly around axis 48. The disk 46 is of an open frame construction so that object 50 can be positioned through the opening of the disk. Object 50 may be supported, for example, on a table 56, which is preferably as transparent as is practical to X-rays.

The output signals generated by the detector assembly 44 are applied to DAS 45 (shown in block diagram form) which generates therefrom the raw data signals. The raw data signals are applied to an array 47 of projection filters which generate the projection data signals. As disk 46 rotates, the projection data signals are used to provide projections from many projection angles. The projection data signals are applied to a streak suppression filter 70 which filters the projection data signals in accordance with the invention in a manner that reduces streaks in the reconstructed CT images. The output signals generated by streak suppression filter 70, referred to as "streak corrected projection data signals" or simply as "streak corrected signals", are then applied to a back-projector 72 which generates the CT images from the streak corrected signals. The back-projector 72 includes a convolution filter in the input stage to convolve the data for back projection.

As will be discussed further below, streak suppression filter 70 is preferably a non-linear filter, and by using the streak corrected signals generated by streak suppression filter 70 rather than the projection data signals generated by projection filter 47, scanner 40 is able to generate improved, better quality CT images having fewer streaks and improved clarity.

Figure 4:
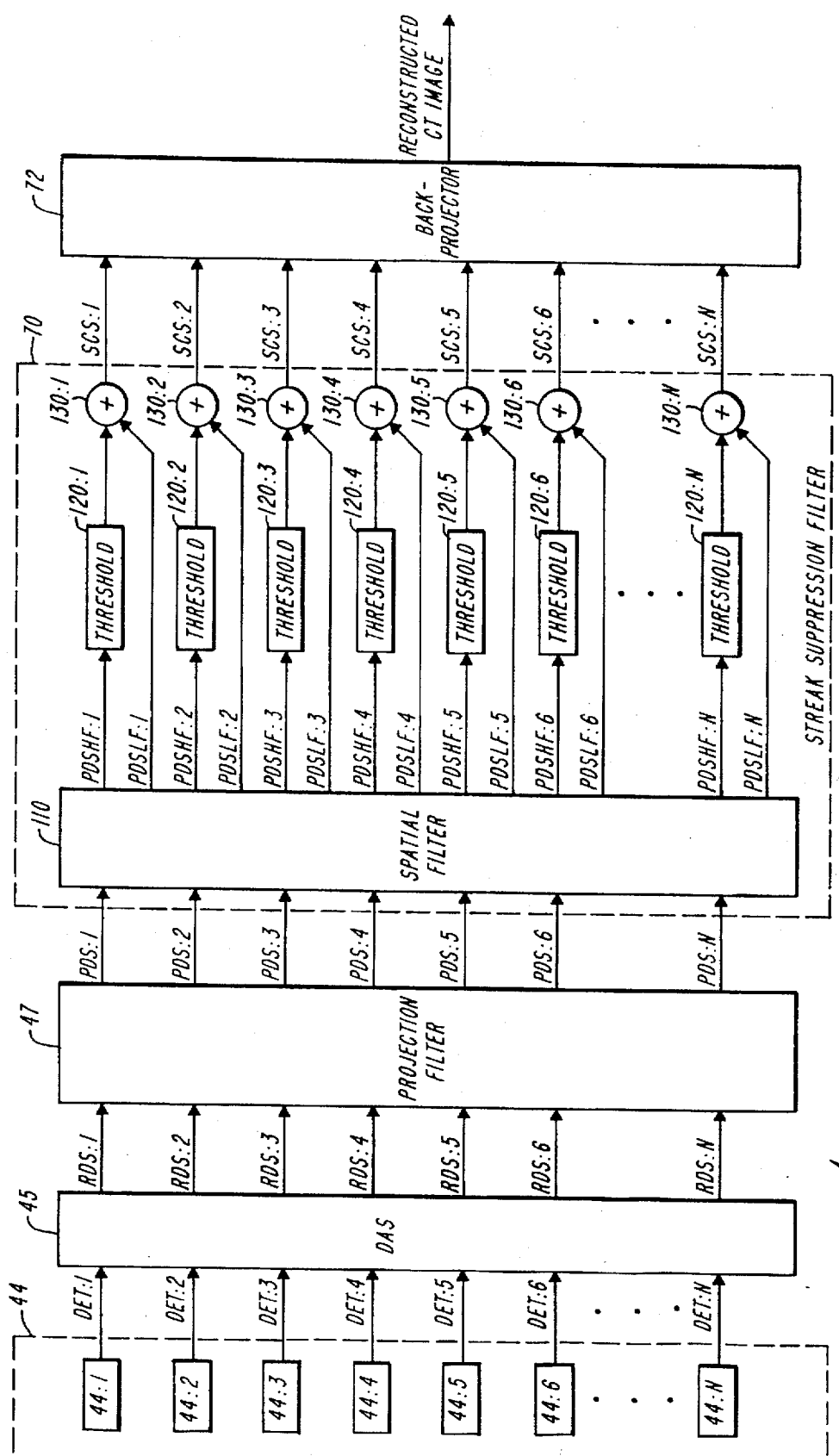
FIG. 4 is a block diagram of a streak suppression filter constructed according to the invention.

FIG. 4 is a block diagram of the signal processing portion of CT scanner 40 showing streak suppression filter 70 in detail. Scanner 40 is an N channel device and detector array 44 includes N detectors 44:1–44:N. As stated above, in the preferred embodiment there are 384 detectors in array 44, so in the preferred embodiment N is equal to 384, however, other numbers of channels are of course possible. The N detectors in array 44 generate N detector output signals, DET:1–DET:N at every projection angle which are applied to DAS 45. DAS 45 filters the detector output signals and generates N corresponding raw data signals, RDS:1–RDS:N. The N raw data signals are applied to projection filter 47 which generates N corresponding projection data signals, PDS:1–PDS:N at every projection angle. The N projection data signals are applied to streak suppression filter 70 which generates N streak corrected signals, SCS:1–SCS:N for every projection angle. The N streak corrected signals from all of the projection angles are applied to back-projector 72 which generates the reconstructed CT images.

Streak suppression filter 70 performs essentially the same functions for the data collected at each of the projection angles, and in general only the processing for the data collected at one of the projection angles will be discussed. Streak suppression filter 70 includes a spatial filter 110, a set of N threshold devices 120:1–120:N and a corresponding set of N adders 130:1–130:N. The N projection data signals PDS:1–PDS:N generated by projection filter 47 are applied to spatial filter 110 and in response spatial filter 110 generates N high frequency signals, PDSHF:1–PDSHF:N, and N low frequency signals PDSLF:1–PDSLF:N. The N high frequency signals PDSHF:1–PDSHF:N are applied to the N threshold devices 120:1–120:N which generate therefrom a set of N output signals referred to as "filtered signals" or "clipped signals". Each clipped signal and its corresponding low frequency signal are applied to the inputs of one of the N adders 130:1–130:N which generates therefrom a corresponding streak corrected signal, so that the N adders 130:1–130:N generate the N streak corrected signals SCS:1–SCS:N.

The data in each channel includes one detector output signal, one raw data signal, one projection data signal, one high frequency signal, one low frequency signal, and one streak corrected signal. So for example, the data in the third channel includes the third channel detector output signal DET:3 generated by the third channel detector 44:3, the third channel raw data signal RDS:3, the third channel projection data signal PDS:3, the third channel high and low frequency signals PDSHF:3, PDSLF:3, and the third channel streak corrected signal SCS:3.

For purposes of generating the high and low frequency signals, each channel in scanner 40 is preferably associated with a neighborhood of channels. Spatial filter 110 preferably generates each channel's high frequency signal by performing a spatial high pass filtering operation on the projection data signals in that channel's neighborhood, and similarly, spatial filter 110 preferably generates each channel's low frequency signal by performing a spatial low pass filtering operation on the projection data signals in that channel's neighborhood. Each neighborhood preferably includes a group of adjacent channels, and one preferred neighborhood size is three, meaning that each neighborhood is formed by grouping a central channel with the two channels on either side of that central channel. For example, the third channel may be grouped with the second and fourth channel to form a neighborhood of three channels, and the spatial filter 110 then generates the high frequency signal in the third channel PDSHF:3 by combining the projection data signals in the second, third and fourth channels PDS:2, PDS:3, PDS:4 using an appropriate high pass filtering convolution mask. Similarly, spatial filter 110 generates the low frequency signal in the third channel PDSLF:3 by combining the projection data signals in the second, third, and fourth channels PDS:2, PDS:3, PDS:4 using an appropriate low pass filtering convolution mask. Another preferred neighborhood size is five, and as those skilled in the art will appreciate, other neighborhood sizes will also function well with the invention. Further, the low and high pass filtering operations performed by spatial filter 110 preferably direct all of the energy of each projection data signal into either the corresponding low frequency signal or the corresponding high frequency signal such that a subsequent combination of corresponding high and low frequency signals will exactly reproduce the original projection data signal.

Each of the N threshold devices 120:1–120:N performs a clipping operation on its input signal, i.e., each threshold device compares its input high frequency signal to a threshold, and generates a clipped signal that is equal to the high frequency signal when the magnitude of the high frequency signal is less than that of the threshold and is equal to the threshold when the high frequency signal is greater than the threshold and is equal to negative one times the threshold when the high frequency signal is less than negative one times the threshold. Alternatively, as will be discussed in greater detail below, each of the threshold devices may generate a clipped signal that is equal to a preselected value that is not equal to the threshold when the high frequency signal is greater than the threshold and is equal to negative one times the preselected value when the high frequency signal is less than negative one times the threshold. The values of the threshold and the preselected value may be permanently programmed into the threshold devices or may be selected by an operator. Each of the N adders 130:1–130:N then sums the clipped signal and the low frequency signal in its channel to generate that channel's streak corrected signal.

Figure 5:
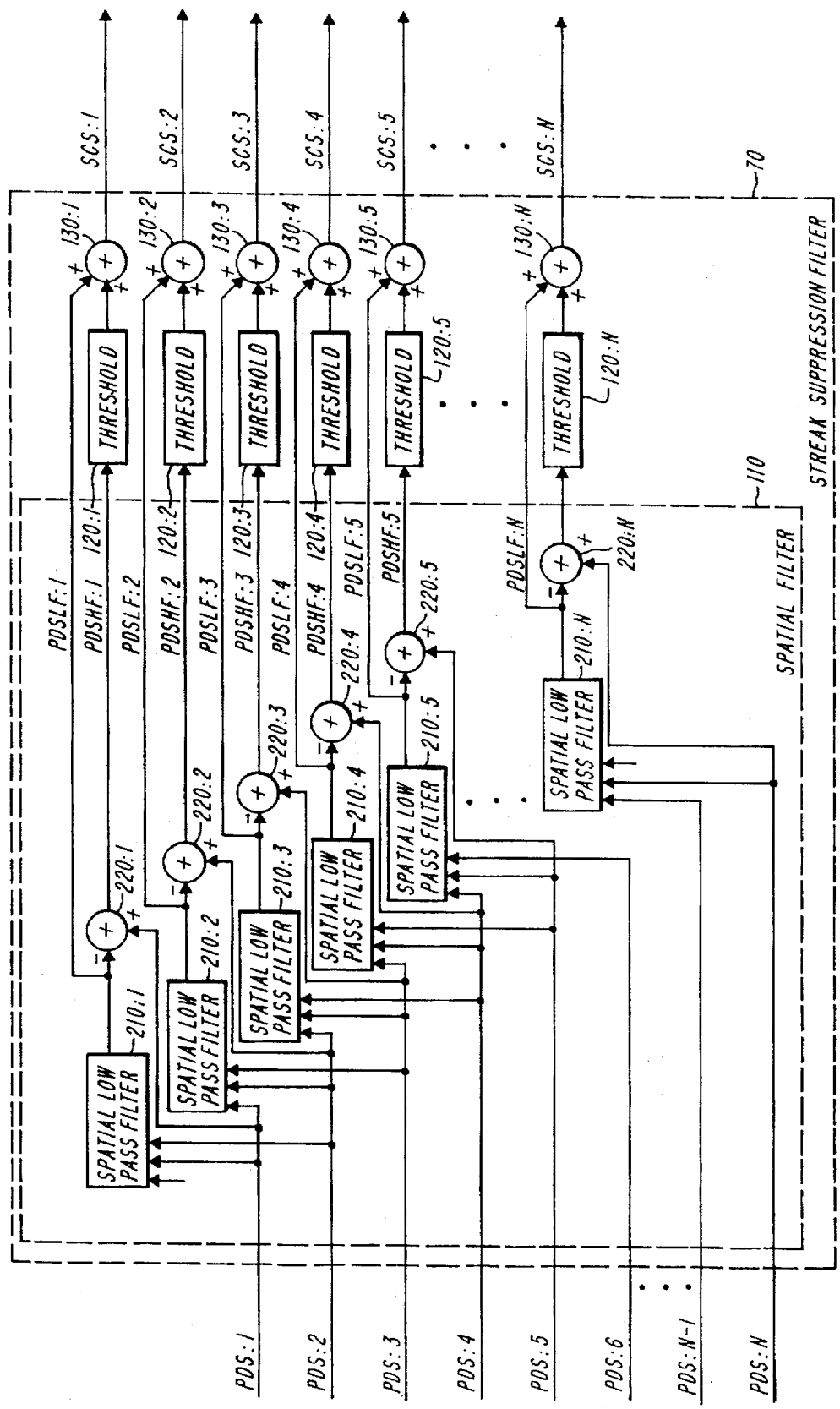
FIG. 5 is a block diagram of the streak suppression filter shown in FIG. 4 showing one embodiment of the spatial filter in detail.

FIG. 5 is a block diagram illustrating one preferred embodiment of streak suppression filter 70 in which spatial filter 110 is implemented using a set of N three-point, spatial low pass filters 210:1–210:N and a corresponding set of N subtractors 220:1–220:N. In each channel, the spatial low pass filter has three inputs coupled to receive the projection data signals from that channel's neighborhood and generates therefrom that channel's low frequency signal. The low frequency signal in each channel is applied to the negative input of that channel's subtractor and that channel's projection data signal is applied to the positive input of that channel's subtractor. In each channel, the subtractor then subtracts that channel's low frequency signal from that channel's projection data signal and thereby generates that channel's high frequency signal which is applied to that channel's threshold device. For example, the low frequency signal in the third channel PDSLF:3 generated by low pass filter 210:3 is applied to the negative input of the third channel's subtractor 220:3 and the projection data signal in the third channel PDS:3 is applied to the positive input of the third channel's subtractor 220:3. Subtractor 220:3 subtracts the signal at its negative input from the signal at its positive input to generate the third channel's high frequency signal PDSHF:3 and applies this signal to the third channel's threshold device 120:3. Since the high frequency signal in each channel is generated simply by subtracting that channel's low frequency signal from that channel's projection data signal, a subsequent addition of a single channel's low and high frequency signals will reproduce exactly that channel's original projection data signal. This is preferable so that when a high frequency signal is below the threshold, the streak corrected signal is exactly equal to the original projection data signal and all high frequency information is preserved for use in reconstructing a CT image. In this embodiment, each streak corrected signal is equal to its corresponding original projection data signal when the amplitude of the high frequency signal is less than the threshold. However, when the amplitude of the high frequency signal exceeds the threshold, the streak corrected signal is essentially generated by removing some of the high frequency energy from its corresponding original projection data signal.

In one preferred embodiment, the spatial low pass filters generate the low frequency signals according to Equation (1)

$$PDSLF{:}x = 0.25 PDS{:}(x-1) + 0.50 PDS{:}x + 0.25 PDS{:}(x+1) \quad (1)$$

in which x is an integer that may range from 2 to (N−1). As a specific example, spatial low pass filter 210:4 in the fourth channel generates the low frequency signal PDSLF:4 for the fourth channel by summing 0.25 times the projection data signal from the third channel PDS:3, 0.50 times the projection data signal from the fourth channel PDS:4, and 0.25 times the projection data signal from the fifth channel PDS:5. As those skilled in the art will appreciate, Equation (1) is equivalent to performing a convolution on the projection data signals with the three point convolution mask {0.25, 0.50, 0.25}. In this embodiment, the low pass filters are three point filters and use a neighborhood of three detectors. In another preferred embodiment, the low pass filters are five point filters and use a neighborhood of five detectors and use the mask {0.10, 0.25, 0.30, 0.25, 0.10}. These masks are "averaging" or "blurring" masks, and are given by way of example. Other averaging masks and other neighborhood sizes will also function well with the invention. Further, the spatial low pass filters may be implemented using other finite impulse response (FIR) filters, infinite impulse response (IIR) filters, recursive or non-recursive filters, and by frequency domain filters using for example a Fourier transform technique.

Spatial low pass filter 210:1 calculates the low frequency signal PDSLF:1 for the first channel which is positioned at one end of the array of channels. Since this channel does not have adjacent channels on both sides, it is not possible for filter 210:1 to generate its low frequency output signal according to Equation (1), and as shown in FIG. 5, filter 210:1 is only coupled to receive two projection data signals. This problem of computing neighborhood type processing near the end of an array is well understood in the image processing arts, and filter 210:1 may use any number of known methods for calculating its low frequency output signal PDSLF:1. For example, spatial low pass filter 210:1 may couple its third input (shown unconnected in FIG. 5) to a reference (e.g., ground) so that the third input is always interpreted as a zero and then convolve the three inputs with a scaled up version of the convolution mask used by the other filters. Alternatively, filter 210:1 may couple both the second and the third inputs to the second channel projection data signal PDS:2. Or, filter 210:1 may use a different convolution mask than the other filters. Similar options are of course available for filter 210:N located at the other end of the array.

Streak suppression filter 70 has been discussed in connection with FIG. 5 as including an array of low pass filters. As those skilled in the art will appreciate, steak suppression filter 70 may also be implemented using a set of high pass filters rather than low pass filters. In this embodiment, the high frequency signals are generated by the high pass filters, and the low frequency signals are generated by subtracting the high frequency signals from the corresponding projection data signals. Further, streak suppression filter 70 may be implemented using a set of high pass filters and a set of low pass filters for generating the high and low frequency signals, respectively.

Streaks in reconstructed CT images are essentially caused by high amplitude, high frequency, components in the projection data signals. Therefore, CT images reconstructed from the streak corrected signals generated by streak suppression filter 70 (which have reduced high amplitude, high frequency components) contain fewer streaks. Further, the streaks that do remain in such CT images are of reduced amplitude. Streak suppression filter 70 therefore makes possible the reconstruction of clear CT images having increased utility.

Preferably, the amplitude of the threshold is set so that the threshold devices remove only that portion of the high frequency signal which would generate a streak in the reconstructed CT image. If the threshold is set too low and the threshold devices thereby remove too much of the high frequency signal, the streak corrected signals will essentially contain only low frequency information. CT images reconstructed from such signals may not have any streaks but they will also be of poorer quality since all the high frequency information, which makes high resolution imaging possible, will have been removed from the streak corrected signals. Conversely, if the threshold is set too high, the quality of the resultant reconstructed CT images may be degraded by streaks. Since the regions of interest in a CT image are normally the soft tissue regions and not the regions containing bones, the threshold is preferably set high enough to preserve the integrity of the image information relating to the soft tissue regions and low enough to remove the high amplitude, high frequency, components generated by bone-tissue interfaces. Setting the threshold in this manner may degrade the resolution of the resultant CT images in the regions near bone-tissue interfaces, however since these regions are rarely of interest, it is acceptable to sacrifice some resolution In these regions to obtain high resolution streak free, or reduced streak, images in the soft tissue regions. The threshold is therefore preferably set higher than the amplitude of typical high frequency signals generated from regions free of bone-tissue interfaces and slightly lower than the amplitude of typical high frequency signals generated by bone-tissue interfaces.

One method of tuning streak suppression filter 70 is to initially set the threshold to zero and generate some reconstructed CT images. These images will be derived only from the low frequency signals and therefore will be poorer quality. By viewing these images an operator may select an appropriate low pass filtering function (i.e., a convolution mask) for use in generating the low frequency signals. Preferably, a low pass filtering function is chosen that filters (or blurs) the raw data as little as is required to provide the desired amount of streak suppression. Once a low pass filtering function is chosen, the operator slowly increases the threshold from zero until streaks begin to appear in the reconstructed images. Since soft tissue regions contain high frequency components, setting the threshold too low will cause loss of information in soft tissue regions. Therefore, the threshold should be set as high as possible while maintaining the desired degree of streak suppression. Even when optimally tuned, streak suppression filter 70 may introduce small intensity errors into the reconstructed CT images. However, these errors are much smaller than the streaks and they are hardly visible to the human eye. The streak suppression achieved by filter 70 justifies the toleration of such errors.

Figure 1:
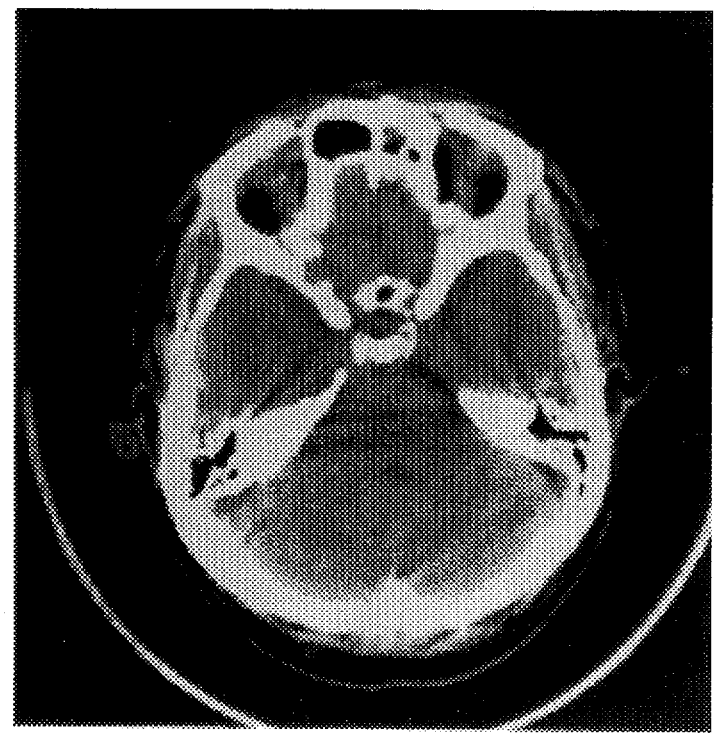
FIG. 1 is a CT image of a human head, the image being illustrative of the problems associated with streaks.
Figure 6:
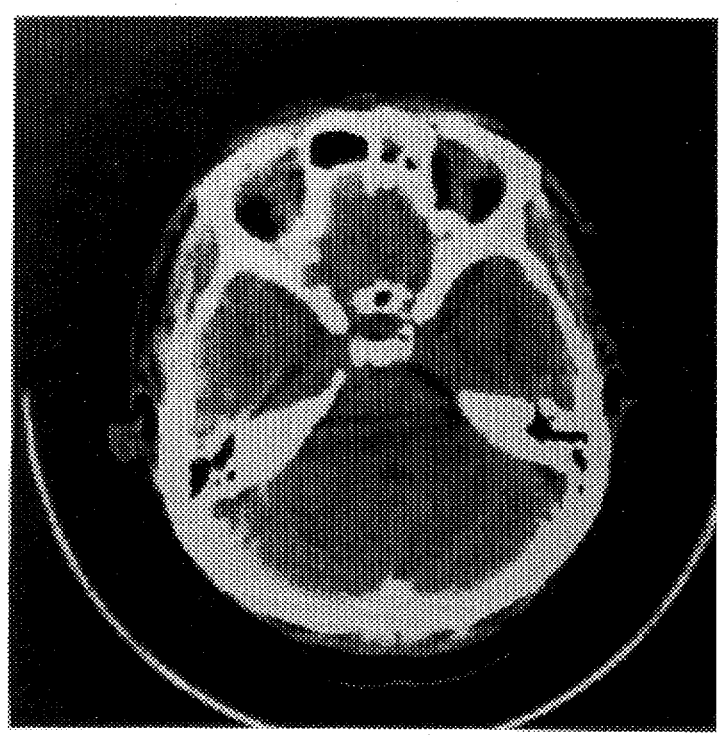
FIG. 6 is a CT image of a human head reconstructed using the same raw data that was used to reconstruct the image shown in FIG. 1, and also using a streak suppression filter according to the invention.
Figure 2A:
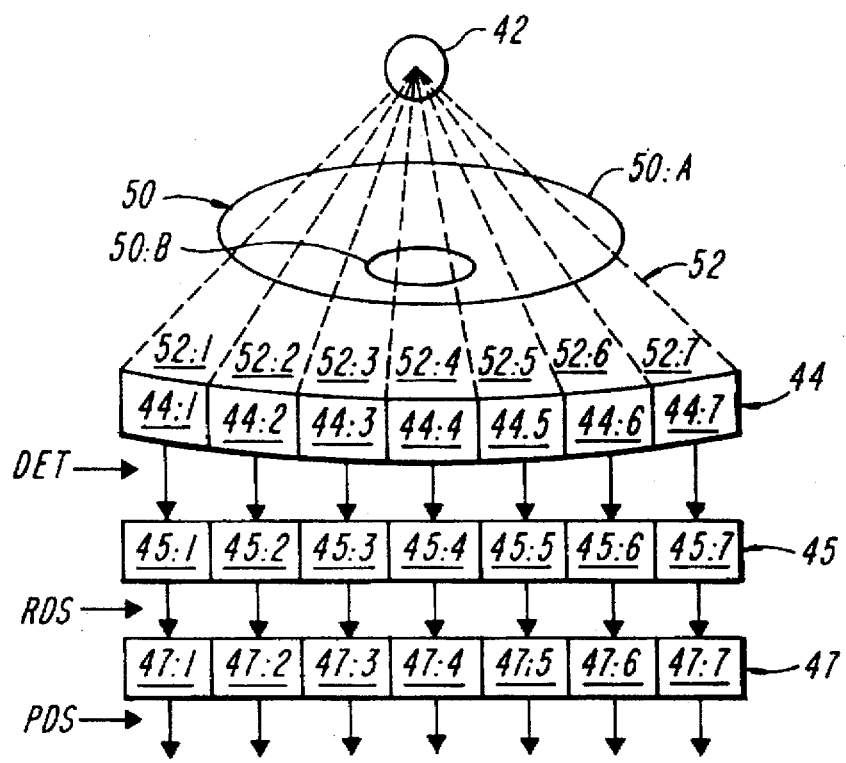
FIG. 2A illustrates the ray paths between an X-ray source and a group of detectors in a CT scanner.
Figure 2B:
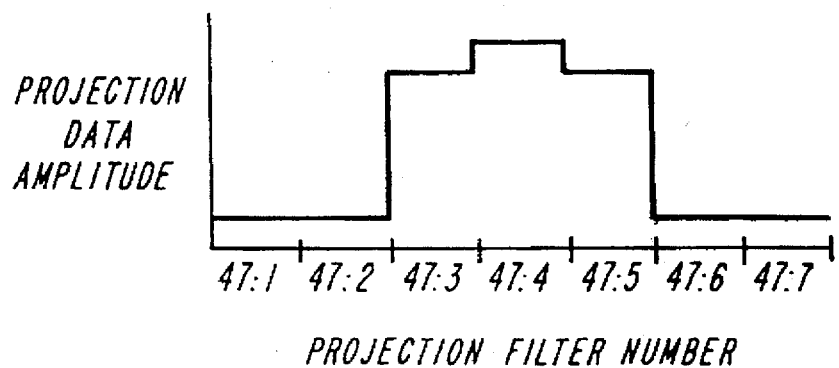
FIG. 2B is a graph showing the amplitude of the projection data, representative of the amount of X-ray absorption, formed by the CT scanner shown in FIG. 2A.

FIG. 6 is a CT image reconstructed using the same data that was used to reconstruct the CT image shown in FIG. 1. However, in FIG. 6, the projection data signals were first processed using streak suppression filter 70. For generation of this image, streak suppression filter 70 used a mask of {0.10, 0.25, 0.30, 0.25, 0.10} to generate the low frequency signals and a threshold of 0.006 while the maximum projection data signal was about 4.8. The image shown in FIG. 6 has far fewer streaks than the image shown in FIG. 1 and has increased clarity.

Streak suppression filter 70 has been discussed in connection with using a threshold device 120 (shown in FIGS. 4–5) to clip the high amplitude portions of the high frequency signals. FIG. 7A is a graph of the transfer function of the threshold devices 120. The output signal generated by a threshold device 120 is equal to the input signal that is applied to the threshold device when the magnitude of the input signal is less than that of the threshold, and the output signal is limited to the threshold when the magnitude of the input signal is greater than that of the threshold. The threshold device 120 may be understood as generating an output signal that is a function of its input signal, a first threshold, and a second threshold so that the output signal is equal to the first threshold when the input signal is less than the first threshold, the output signal is equal to the input signal when the input signal is greater than the first threshold and less than the second threshold, and the output signal is equal to the second threshold when the input signal is greater than the second threshold. In the transfer function shown in FIG. 7A, the first and second thresholds are equal in magnitude and opposite in polarity, however, those skilled in the art will appreciate that in other embodiments the first and second thresholds need not be related in this manner.

Figure 7E:
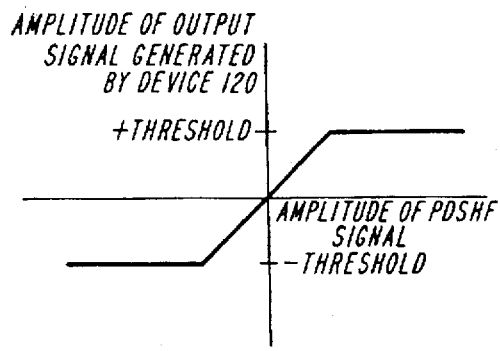
Figure 7E:
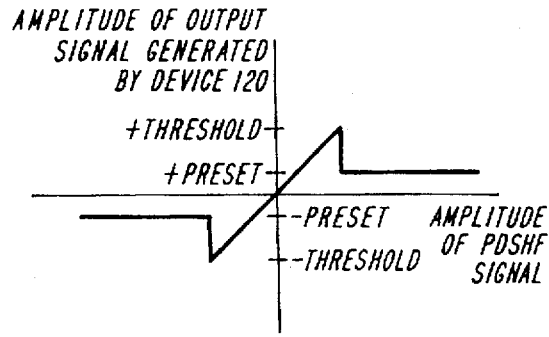
Figure 7E:
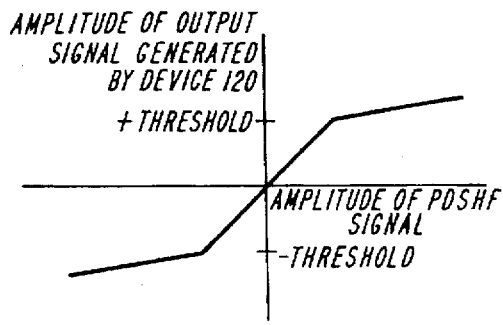
Figure 7E:
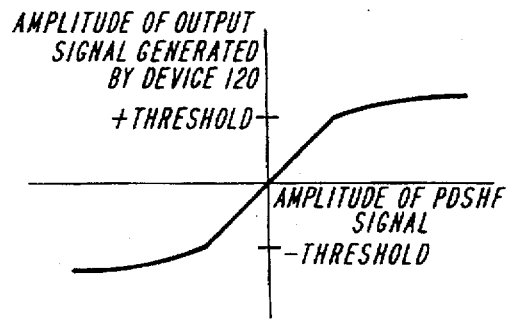
Figure 7E:
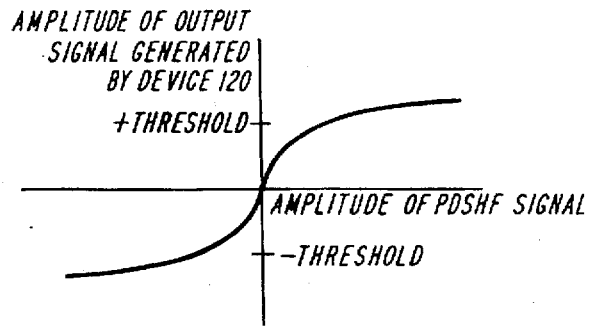

In still other embodiments, the threshold devices 120 may alternatively be implemented using filters having transfer functions that are different than the one shown in FIG. 7A. FIGS. 7B–E are examples of other transfer functions which will also function well with the invention. A preferred transfer function is shown in FIG. 7B, and when a threshold device 120 uses this transfer function it generates an output signal as a function of its input signal, a positive threshold, a negative threshold, a positive preselected value PRESET, and a negative preselected value -PRESET, so that the output signal is equal to the negative preselected value -PRESET when the input signal is less than the negative threshold, the output signal is equal to the input signal when the input signal is greater than the negative threshold and less than the positive threshold, and the output signal is equal to the positive preselected value PRESET when the input signal is greater than the positive threshold. Preferably, the preselected value PRESET has a smaller magnitude than that of the threshold, and more preferably, the constant PRESET is set equal to zero. If the transfer function shown in FIG. 7C is used, then the devices 120 generate an output signal that is equal to the input signal applied to the device 120 when the magnitude of the input signal is less than that of the threshold, and the output signal is equal to a linearly compressed version of the input signal when the magnitude of the input signal is greater than that of the threshold. Similarly, if the transfer function shown in FIG. 7D is used, then the output signal generated by devices 120 is equal to a non-linearly compressed version of the input signal when the magnitude of the input signal is greater than that of the threshold. If the transfer function shown in FIG. 7E is used, then devices 120 apply some amplification to the input signal when the magnitude of the input signal is less than that of the threshold, and apply some compression to the input signal when the magnitude of the input signal is greater than that of the threshold. As those skilled in the art will appreciate, the transfer functions shown in FIGS. 7A–E are merely exemplary, and the invention will function well with any device 120 which compresses the streak forming, high amplitude, high frequency components of the projection data signals and which applies little or no filtering to the non-streak forming, low amplitude, high frequency components of the projection data signals. Such filters which selectively apply a relatively large degree of filtering to one portion of an input signal (i.e., high amplitude, high frequency components) and which selectively apply a relatively small degree of filtering to another portion of the input signal (i.e., low amplitude, high frequency components) are generally non-linear, and therefore, streak suppression filter 70 is preferably implemented as a non-linear filter.

The invention has also been discussed in terms of applying a filter, such as threshold devices 120 to the high frequency signals. As those skilled in the art will appreciate, in other configurations the filter may also operate in an equivalent fashion directly on the projection data signals, rather than on low and high frequency signals, to generate the streak corrected signals. Also, streak suppression filter 70 has been discussed in connection with generating the high and low frequency signals so that when the high frequency signal is less than the threshold an addition of one channel's high and low frequency signals will exactly reproduce that channel's projection data signal. While it is preferred to generate the high and low frequency signals in this manner, those skilled in the art will appreciate that the invention will also function well if the high and low frequency signals are not generated in this manner.

Figure 8:
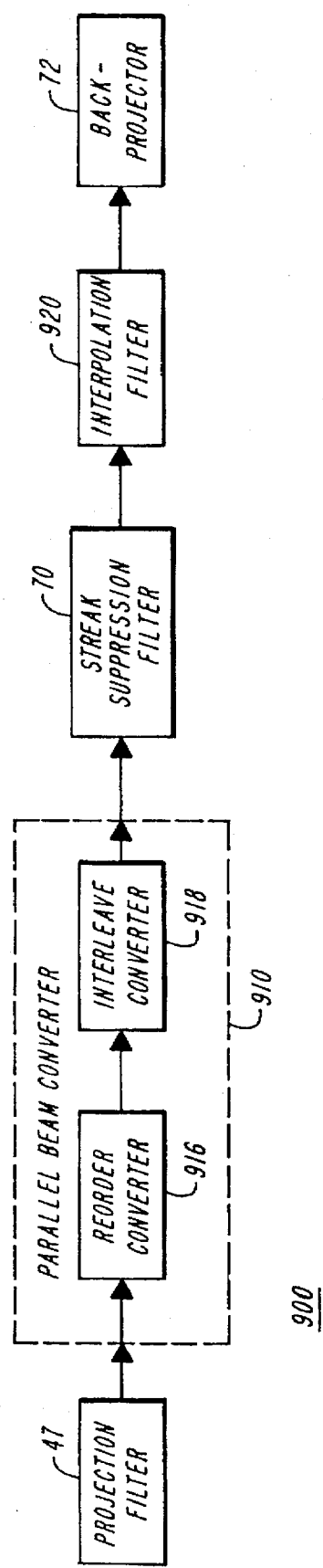
FIG. 8 is a block diagram of a signal processing portion of a preferred CT scanner constructed according to the invention.

Streak suppression filter 70 has been discussed in connection with use in a CT system for generating the streak corrected signals from the projection data signals supplied from projection filter 47. However, CT systems constructed according to the invention may apply other types of filtering to the projection data signals prior to reconstructing a CT image. FIG. 8 is a block diagram of the signal processing portion of a preferred CT system 900 constructed according to the invention. System 900, in addition to streak suppression filter 70, includes a parallel beam converter 910, and an interpolation filter 920. In system 900, the projection data signals generated by projection filter 47 are applied to parallel beam converter 910 which generates therefrom a set of parallel beam signals. The parallel beam signals are applied to streak suppression filter 70 which generates therefrom the streak corrected signals. The streak corrected signals are then applied to interpolation filter 920, the output of which is applied to back-projector 72 which generates therefrom the reconstructed CT images.

Parallel beam converter 910 includes a reorder converter 916 and an interleave converter 918. Reorder converter 916 receives the projection data signals from projection filter 47 and generates therefrom a set of reordered signals. The reordered signals are applied to interleave converter 918 which generates therefrom the parallel beam signals. The projections generated by projection filter 47 may be thought of as "fan beam" data, since all the projections are generated using fan beam 52 (shown in FIG. 3). Parallel beam converter 910 re-organizes the projections to form parallel beam projections.

The measurements of the projection data signals generated by projection filter 47 that are collected during a single scan (i.e., one rotation of the disk) may be organized in a matrix PDS as shown in Equation (2).

$$PDS = \begin{bmatrix} PDS(0,0) & PDS(1,0) & \ldots & PDS(N-1,0) \\ PDS(0,\Delta\theta) & PDS(1,\Delta\theta) & \ldots & PDS(N-1,\Delta\theta) \\ PDS(0,2\Delta\theta) & PDS(1,2\Delta\theta) & \ldots & PDS(N-1,2\Delta\theta) \\ \vdots & & & \\ PDS(0,360-\Delta\theta) & PDS(1,360-\Delta\theta) & \ldots & PDS(N-1,360-\Delta\theta) \end{bmatrix} \quad (2)$$

Each element $PDS(i,\theta)$ in the PDS matrix represents a measurement of the projection data signal in the ith channel for a projection angle equal to $\theta$. In Equation (2), N represents the number of channels in scanner 40. As stated above, in the preferred embodiment there are 384 detectors in the array 44, so in the preferred embodiment there are 384 channels in scanner 40 and N is equal to 384. $\Delta\theta$ represents the amount of rotation of disk 46 between successive projections (i.e., the angular increment of the projection angle between successive projections). In the preferred embodiment, disk 46 rotates one eighth of a degree between each projection and scanner 40 generates 2880 projections in a single scan (i.e., eight projections per degree for 360 degrees), so in the preferred embodiment $\Delta\theta$ is equal to 0.125 degrees. Each row of the PDS matrix represents all the measurements of the projection data signals collected at a single projection angle. In the preferred embodiment, there are 2880 rows in the PDS matrix. Each column of the PDS matrix represents all the measurements of one channel's projection data signal collected during one scan, and in the preferred embodiment there are 384 columns in the PDS matrix. The PDS matrix has cyclical nature in that the first row is the continuation of the last row, that is, PDS (i,0)= PDS (i,360).

Figure 9A:
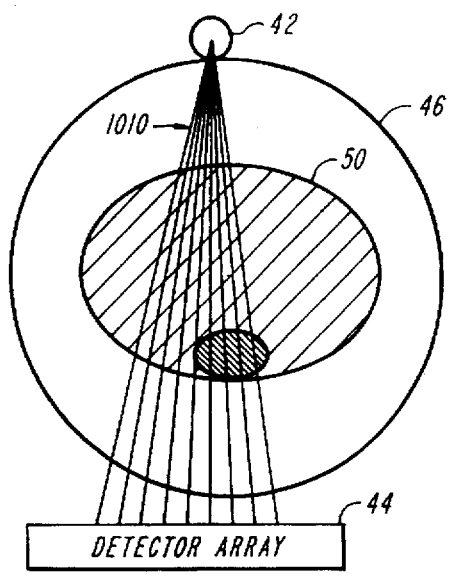
FIG. 9A illustrates a portion of one projection formed by a set of rays that are not parallel.
Figure 9B:
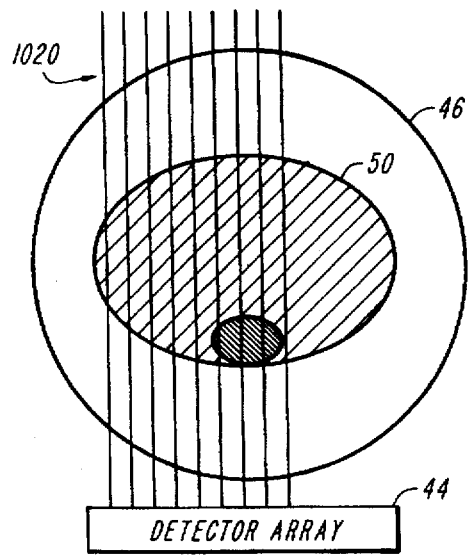
FIG. 9B illustrates a portion of one modified projection formed by a set of parallel rays.

FIG. 9A illustrates a set of rays 1010 forming one portion of a single fan beam projection view of a cross section of patient 50. Since each of the rays emanates from X-ray source 42, which is essentially a point source, none of the rays 1010 are parallel, and the resulting projection is a fan beam projection. Each row of the PDS matrix corresponds to a single fan beam projection. Reorder converter 916 re-organizes the projection data signals so that each re-organized projection is formed by a set of parallel rays such as the rays 1020 shown in FIG. 9B.

Figure 10A:
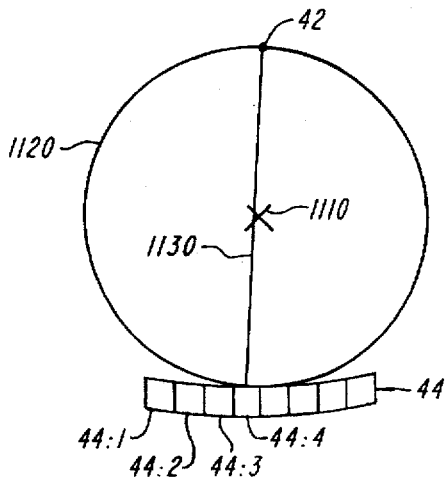
FIGS. 10A–B illustrate one method of forming a projection generated by a set of parallel rays.
Figure 10B:
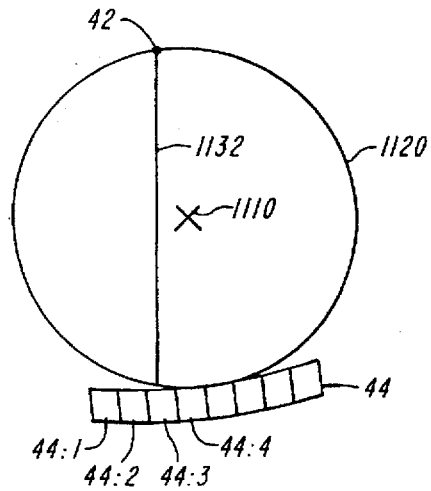

FIGS. 10A–B illustrate one preferred method, which may be used by reorder converter 916, for generating the re-organized projections. FIGS. 10A–B show the positions of X-ray source 42 and detector array 44 during generation of two successive projection views. During a scan, X-ray source 42 and detector array 44 rotate in a counter clockwise direction about a center 1110 of circle 1120. During the first projection, shown in FIG. 10A, a ray 1130 is incident on a detector 44:4 (i.e., the detector in the fourth channel of array 44). During the next projection, shown in FIG. 10B, a ray 1132 is incident on detector 44:3 (i.e., the detector in the third channel of array 44). In the preferred embodiment, the spacing between the detectors is matched to the amount of rotation between generation of successive projections so that ray 1130 is parallel to, and slightly offset from, ray 1132. In the preferred embodiment, this basic relationship is true for all detectors so that any two rays incident on adjacent detectors during successive projections are parallel and are slightly offset from each other. As was stated above, in the preferred embodiment $\Delta\theta$ is equal to 0.125 degrees, so in the preferred embodiment, each detector in array 44 is spaced apart from its adjacent detectors by 0.125 degrees. Reorder converter 916 uses this basic relationship to reorder the data and generate the re-organized projections.

Reorder converter 916 preferably re-organizes the PDS matrix to form a matrix RE of reordered signals so that each row of the RE matrix is equivalent to a projection formed by a parallel beam. Reorder converter 916 preferably generates the RE matrix so that each element $RE(i,\theta)$ of the RE matrix is chosen according to the formula shown in Equation (3).

$$RE(i,\theta)=PDS(i,[i-j][\Delta\theta]+\theta) \quad (3)$$

where the jth channel is the channel nearest to the geometrical center of the detector array. Each element $RE(i,\theta)$ of the RE matrix represents a measurement of the reordered signal in the ith channel for a parallel beam projection angle of $\theta$. Reorder converter 916 may also use a low pass filter to average the projections of adjacent angles for each channel. The averaged, or decimated, reordered matrix RE will have fewer numbers of rows at larger angular intervals $\Delta\theta$. Decimating the RE matrix in this fashion reduces the computations for subsequent operations.

Figure 11A:
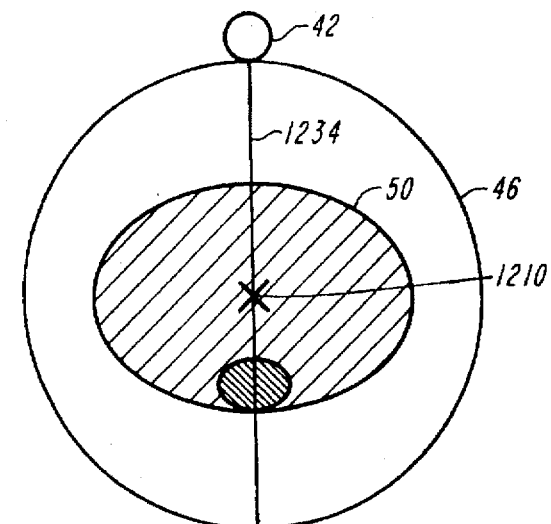
FIGS. 11A–B illustrate the spatial relationship between the X-ray source, the patient, and the detector array for a CT scanner constructed according to the invention for projection angles of zero and 180 degrees, respectively.
Figure 11B:
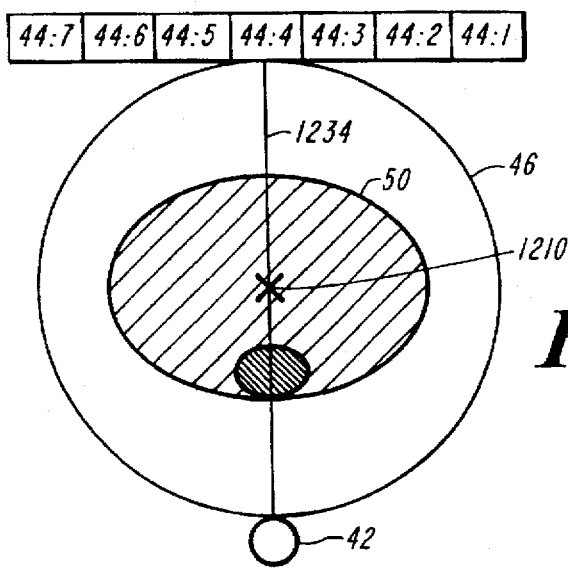

Interleave converter 918 (shown in FIG. 8) receives the reordered signals and generates therefrom the parallel beam signals. Interleave converter 918 preferably combines pairs of parallel beam projections that are spaced apart by 180 degrees to form denser projections. FIGS. 11A and 11B illustrate the spatial relationship between X-ray source 42, a cross section of patient 50, and detector array 44 for projection angles of zero and 180 degrees, respectively. In FIGS. 11A–B, detector array 44 is shown containing seven detectors, and the detector in the fourth channel 44:4 is the central detector of the array 44. As was stated above, in the preferred embodiment, detector array 44 has 384 detectors, however, for convenience, the seven detector embodiment will now be discussed. In the preferred embodiment, detector array 44 is slightly offset from the center 1210 of disk 46 such that a line 1234 intersecting the focal spot of source 42 and center 1210 does not intersect the center of the central detector 44:4. The arrangement of such a detector system is more fully described in U.S. patent application Ser. No. 08/191,428, entitled, X-RAY TOMOGRAPHY SYSTEM FOR AND METHOD OF IMPROVING THE QUALITY OF A SCANNED IMAGE, filed on Feb. 3, 1994, (Attorney Docket No. ANA-044) and assigned to the present assignee, which is hereby incorporated by reference.

Figure 12:
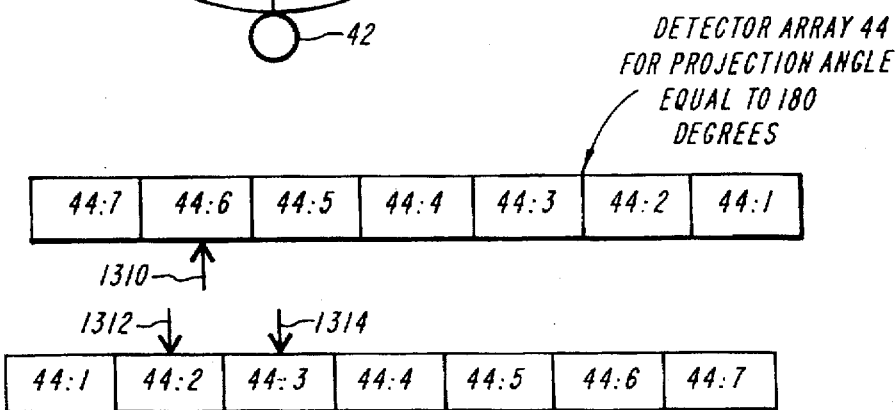
FIG. 12 illustrates the spatial relationship between the detector array and the associated rays for projection angles of zero and 180 degrees.

FIG. 12 illustrates the spatial relationship between detector array 44 at projection angles of zero and 180 degrees, and the rays 1310, 1312, 1314 incident on three of the detectors. Because of the offset between array 44 and the center 1210 of disk 46, the detector array 44 at a projection angle of zero degrees is slightly offset from the detector array 44 at 180 degrees. Consequently, the ray 1310 that is incident on the sixth channel detector 44:6 for a projection angle of 180 degrees falls between the rays 1312 and 1314 that are incident on detectors 44:2 and 44:3, respectively, for a projection angle of zero degrees. In this example, detector 44:6 may be thought of as a "central" detector and detectors 44:2 and 44:3 may be thought of as "opposite-adjacent" detectors. At each projection angle, each detector measures the density of a portion of the patient, and in general, the portions measured by the opposite-adjacent detectors are closer to the portion measured by the central detector than are the portions measured by any other detectors (e.g., the portions measured by detectors 44:2, 44:3 at a projection angle of zero degrees are closer to the portion measured by detector 44:6 at a projection angle of 180 degrees than are the portions measured by detectors 44:5, 44:7 at a projection angle of 180 degrees). Any two projections separated by 180 degrees may be interleaved using this relationship between central and opposite-adjacent detectors to form a single denser projection. For example, one such interleaved projection for the arrangement shown in FIG. 12 is composed of the quantities [RE(1,0), RE(7,180), RE(2,0), RE(6,180), RE(3,0), RE(5,180), RE(4,0), RE(4,180), RE(5,0), RE(3,180), RE(6,0), RE(2,180), RE(7,0), RE(1,180)] in which $RE(i,\theta)$ is the reordered signal generated from the detector in the ith channel at a projection angle of $\theta$. Interleave converter 918 interleaves the reordered signals in this manner to form denser projections.

Interleave converter 918 preferably generates a matrix PAR of measurements of the parallel beam signals, and each element $PAR(i,\theta)$ of the PAR matrix is a measurement of the parallel beam signal in the ith channel for a parallel beam projection angle equal to $\theta$. The structure of the PAR matrix is shown in Equation (4).

$$PAR = \begin{bmatrix} PAR(0,0) & PAR(1,0) & \ldots & PAR(2N-1,0) \\ PAR(0,\Delta\theta) & PAR(1,\Delta\theta) & \ldots & PAR(2N-1,\Delta\theta) \\ PAR(0,2\Delta\theta) & PAR(1,2\Delta\theta) & \ldots & PAR(2N-1,2\Delta\theta) \\ \cdot & & & \\ \cdot & & & \\ \cdot & & & \\ PAR(0,180-\Delta\theta) & PAR(1,180-\Delta\theta) & \ldots & PAR(2N-1,180-\Delta\theta) \end{bmatrix} \quad (4)$$

As shown in Equation (4), the PAR matrix has twice as many columns as the PDS matrix, and half as many rows. So each row of the PAR matrix represents a parallel beam projection containing twice as much data as a row of the PDS matrix. So, each parallel beam projection may be thought of has having twice as many channels as a fan beam projection. Slightly different from the PDS matrix, the PAR matrix has a cyclical property in which the last row continues into the first row in reverse order, that is, PAR (0,180)=PAR (2N-1, 0); PAR (1,180)=PAR (2N-2,0) and so on. In the preferred embodiment, interleave converter 918 generates the elements of the PAR matrix according to the formula shown in Equation (5).

$$PAR(2i,\theta)=RE(i,\theta)$$

$$PAR(2i+1,\theta)=RE(N-1-i,\theta+180) \quad (5)$$

for $0<i<N$

As is well known, parallel beam converters such as converter 910 (shown in FIG. 8) for converting fan beam data to parallel beam data normally include an interpolation filter, such as filter 920. However, the interpolation filter is normally disposed immediately following the interleave converter 918. Since the detectors are generally spaced so that the angular offset between adjacent detectors, relative to the X-ray source, is equal for all detectors, the detectors are not spaced equidistantly in a linear sense. Therefore, each row of the PAR matrix (i.e., each parallel beam projection) contains data points which are not spaced equidistantly. Rather, the elements near the middle of each projection are spaced further apart than are elements near the ends of each projection. The interpolation filter interpolates the data and generates a new matrix of parallel beam data such that all the elements of each projection are spaced equidistantly. In the preferred embodiment of system 900, the interpolation filter 920 uses known techniques to interpolate the data and generate projections containing equidistantly spaced elements, however, filter 920 is preferably disposed after streak suppression filter 70, rather than immediately following the interleave converter 918. However, the invention will also function well if the interpolation filter 920 is disposed immediately following the interleave converter 918 as is normally done in the prior art.

Also, as is well known, converting fan beam data to parallel beam data generally introduces a slight rotation such that the parallel beam projection angle of zero degrees is not exactly coincident with the fan beam projection angle of zero degrees. If not corrected, this rotation results in generating a reconstructed image that is slightly rotated from the horizontal. This rotation is generally introduced because the center detector j as used in Equation (3) is generally not exactly in the center of the detector array. The amount of rotation is generally smaller than $\Delta\theta/2$ and may be corrected using well known techniques by either the interpolation filter 920 or by the back-projector 72 or alternatively may simply be ignored.

While streak suppression filter 70 may operate directly on the projection data signals generated by projection filter 47, the performance of streak suppression filter 70 may improve if the parallel beam signals generated by parallel beam converter 910 are applied to streak suppression filter 70 rather than the projection data signals.

When streak suppression filter 70 operates on the fan beam projection data generated by projection filter 47, those skilled in the art will appreciate that streak suppression filter 70 operates on one row of the PDS matrix at a time. For example, when streak suppression filter 70 is operating on the first row of the PDS matrix (i.e., the row for θ equal to zero degrees) to understand the processing of filter 70, the first element of the row PDS(0,0) may be thought of as being substituted for the previously described signal PDS:1, and the second element of the row PDS(1,0) may be thought of as being substituted for the previously described signal PDS:2, and so on. Similarly, when streak suppression filter 70 operates on the parallel beam signals generated by parallel beam converter 910, then filter 70 operates on one row of the PAR matrix at a time. For example, when streak suppression filter 70 is operating on the first row of the PAR matrix then the first element of the row PAR(0,0) may be thought of as being substituted for the previously described signal PDS:1, and the second element of the PAR matrix PAR(1,0) may be thought of as being substituted for the previously described signal PDS:2, and so on. Since each row of the PAR matrix has twice as many elements as a row of the PDS matrix, filter 70 preferably includes twice as many channels (or 2N channels) when filter 70 operates on the parallel beam signals.

The invention has been discussed in terms of suppressing streaks caused by undersampling of bone-soft tissue interfaces. However, as those skilled in the art will appreciate, streak suppression filter 70 may be used to suppress streaks that are caused by any type of irregularity or imperfection in high amplitude high frequency signals. Streak suppression filter 70 therefore effectively reduces streaks caused by motion of the patient and unwanted motion or vibration of the gantry during a scan, as well as streaks caused by the presence of high density fillings or implants in the patient.

Streak suppression filter 70 has also been discussed in terms of being constructed from a group of components such as low pass filters, adders, and subtractors. As those skilled in the art will appreciate, the number of components used to implement streak suppression filter may be reduced by using multiplexing schemes. For example, with reference to FIG. 5, streak suppression filter 70 may be constructed using one low pass filter, one subtractor, one threshold device, one adder and two 1:N multiplexers, rather than N of each component as shown. Further, streak suppression filter 70 may also be implemented by other means such as by a software program that is executed by a digital computer.

Since certain changes may be made in the above apparatus without departing from the scope of the invention herein involved, it is intended that all matter contained in the above description or shown in the accompanying drawing shall be interpreted in an illustrative and not a limiting sense.

What is claimed is:

1. A streak suppression filter for use in a Computed Tomography system of the type for generating an image of an object, the system including means for generating a plurality of data signals, each of the data signals being representative of a density value of a portion of the object, the filter comprising:

(A) spatial filter means, responsive to a plurality of the data signals defining a neighborhood of data signals, for generating therefrom a high frequency signal and a low frequency signal, the high frequency signal being representative of high frequency components associated with the neighborhood of data signals and the low frequency signal being representative of low frequency components associated with the neighborhood of data signals;

(B) non-linear filter means for non-linearly filtering the high frequency signal so as to generate a filtered signal; and (C) combining means for combining the low frequency signal and the filtered signal to generate a streak corrected signal.

2. A streak suppression filter according to claim 1, wherein the non-linear filter means includes means for compressing a portion of the high frequency signal when said high frequency signal has a relatively large amplitude.

3. A streak suppression filter according to claim 1, wherein the non-linear filter means comprises threshold means for generating the filtered signal as a function of the high frequency signal, a first threshold, a second threshold, a first preselected value, and a second preselected value, wherein the filtered signal equals the first preselected value when the high frequency signal is less than the first threshold, the filtered signal equals the high frequency signal when the high frequency signal is greater than the first threshold and less than the second threshold, and the filtered signal equals the second preselected value when the high frequency signal is greater than the second threshold.

4. A streak suppression filter according to claim 3, wherein the first and second thresholds are selectable.

5. A streak suppression filter according to claim 3, wherein the first and second thresholds are equal in magnitude and opposite in polarity.

6. A streak suppression filter according to claim 3, wherein the first preselected value and the second preselected value are selectable.

7. A streak suppression filter according to claim 3, wherein the first preselected value and the second preselected value are substantially equal to zero.

8. A streak suppression filter according to claim 3, wherein the first preselected value is substantially equal to the first threshold and the second preselected value is substantially equal to the second threshold.

9. A streak suppression filter according to claim 1, wherein the spatial filter means comprises low pass filter means for low pass filtering the neighborhood of data signals so as to generate the low frequency signal.

10. A streak suppression filter according to claim 9, wherein the spatial filter means further comprises subtractor means for subtracting the low frequency signal from one of the data signals in the neighborhood of data signals to generate the high frequency signal.

11. A streak suppression filter according to claim 9, wherein the low pass filter means comprises a three point filter.

12. A streak suppression filter means according to claim 9, wherein the low pass filter means comprises a five point filter.

13. A streak suppression filter according to claim 1, wherein the combining means includes adding means for adding the low frequency signal and the filtered signal so as to generate the streak corrected signal.

14. A streak suppression filter according to claim 1, wherein the spatial filter means comprises high pass filter means for high pass filtering the neighborhood of data signals to generate the high frequency signal.

15. A streak suppression filter according to claim 14, wherein the spatial filter means further comprises subtractor means for subtracting the high frequency signal from one of the data signals in the neighborhood of data signals to generate the low frequency signal.

16. A method of generating signals for use in creating a Computed Tomography image of an object, the method including the steps of:
(A) generating a plurality of data signals, each of the data signals being representative of the density of a portion of the object;
(B) spatially filtering a plurality of the data signals defining a neighborhood of data signals so as to generate a high frequency signal and a low frequency signal, the high frequency signal being representative of high frequency components associated with the neighborhood of data signals and the low frequency signal being representative of low frequency components associated with the neighborhood of data signals;
(C) non-linearly filtering the high frequency signal so as to generate a filtered signal; and
(D) combining the filtered signal and the low frequency signal so as to generate a streak corrected signal.

17. A method according to claim 16, wherein the step of combining comprises adding the filtered signal and the low frequency signal.

18. A method according to claim 16, wherein the spatially filtering step comprises low pass filtering the neighborhood of data signals to generate the low frequency signal.

19. A method according to claim 18, wherein the spatially filtering step further comprises subtracting the low frequency signal from one of the data signals to generate the high frequency signal.

20. A multi-channel filter for use in a Computed Tomography system of the type for generating an image of an object, the system including means for generating a data signal in each of the channels, each of the data signals being representative of a density value of a portion of the object, the filter for reducing streaks in the image, the filter comprising:

(A) multi-channel spatial filter means, responsive to the data signals, for generating therefrom in each channel a high frequency signal and a low frequency signal, the high frequency signal in one of the channels being representative of high frequency components associated with a plurality of the data signals defining a neighborhood of data signals, and the low frequency signal in the one channel being representative of low frequency components associated with said neighborhood of data signals;

(B) multi-channel non-linear filter means, responsive to the high frequency signals, for generating therefrom in each channel a filtered signal, the multi-channel non-linear filter means including means for non-linearly filtering the high frequency signal in each channel so as to generate a corresponding filtered signal in response thereto; and (C) multi-channel combining means, responsive to the low frequency signals and to the filtered signals, for generating therefrom in each channel a streak corrected signal, the combining means generating the streak corrected signal in each channel by combining the corresponding low frequency signal and the filtered signal in the respective channel.

21. A streak suppression filter for use in a Computed Tomography system, the system for generating an image of an object, the system including means for generating a plurality of data signals, each of the data signals being representative of a density value of a portion of the object, the filter comprising non-linear filter means for filtering the data signals and generating a plurality of streak corrected signals by suppressing portions of the data signals having relatively high amplitude high frequency components.

22. A Computed Tomography system including:
(A) means for generating a plurality of data signals, each of the data signals being representative of a density value of a portion of an object;
(B) streak suppression filter means for suppressing portions of the data signals having relatively high amplitude high frequency components to generate a plurality of streak corrected signals; and
(C) back projector means for receiving all the streak corrected signals and generating therefrom an image of the object.

23. A Computed Tomography system including:
(A) means for generating a plurality of data signals, each of the data signals being representative of a density value of a portion of an object;
(B) spatial filter means for generating a high frequency signal and a low frequency signal, the high frequency signal being representative of high frequency components associated with a neighborhood of the data signals and the low frequency signal being representative of low frequency components associated with the neighborhood of data signals;
(C) non-linear filter means for non-linearly filtering the high frequency signal to generate a filtered signal;
(D) combining means for combining the low frequency signal and the filtered signal to generate a streak corrected signal; and
(E) back projector means, responsive to the streak corrected signal, for generating an image of the object.

24. A Computed Tomography system including:
(A) means for generating a plurality of projections at a corresponding plurality of projection angles, each of said projections including N data signals, each of the data signals being representative of a density value of a portion of an object;

(B) spatial filter means for generating N high frequency signals and N low frequency signals in response one of the projections, the ith high frequency signal and the ith low frequency signal being representative of high frequency components and low frequency components, respectively, associated with a plurality of the data signals defining a neighborhood of data signals proximal to the ith data signal in the one projection for all i from one to N;

(C) non-linear filter means for generating N filtered signals in response to the N high frequency signals, the non-linear filter means including means for non-linearly filtering the ith high frequency signal so as to generate the ith filtered signal for all i from one to N;

(D) combining means for generating N streak corrected signals in response to the N filtered signals and the N low frequency signals, the combining means combining the ith filtered signal and the ith low frequency signal to generate the ith streak corrected signal for all i from one to N; and (E) back projector means, responsive to the streak corrected signals, for generating an image of the object.

* * * * *

UNITED STATES PATENT AND TRADEMARK OFFICE

CERTIFICATE OF CORRECTION

PATENT NO.: 5,680,426

DATED: October 21, 1997

INVENTOR(S): Ching-Ming Lai

It is certified that error appears in the above-identified patent and that said Letters Patent is hereby corrected as shown below:

On the title page, item [75],
after Inventor:, delete "Lai Ching-Ming" and insert therefor
-- Ching-Ming Lai --.

Signed and Sealed this

Twenty-third Day of December, 1997

*Attest:*

BRUCE LEHMAN

*Attesting Officer*  *Commissioner of Patents and Trademarks*